United States Patent [19]
Nakatsuyama et al.

[11] Patent Number: 5,802,529
[45] Date of Patent: Sep. 1, 1998

[54] APPARATUS AND METHOD FOR DOCUMENT DATABASE MANAGEMENT OF DOCUMENTS HAVING A PLURALITY OF DOCUMENT STRUCTURES

[75] Inventors: Hisashi Nakatsuyama; Masaki Kyojima; Yo Okumura, all of Yokohama, Japan

[73] Assignee: Fuji Xerox Co., Ltd., Tokyo, Japan

[21] Appl. No.: 580,688

[22] Filed: Dec. 29, 1995

[30] Foreign Application Priority Data

Jan. 6, 1995 [JP] Japan .................................. 7-000650

[51] Int. Cl.$^6$ .................................................. G06T 1/20
[52] U.S. Cl. .................................. 707/513; 707/523
[58] Field of Search .................................. 395/774, 785, 395/779, 772, 619; 707/511, 513, 517, 523, 203

[56] References Cited

U.S. PATENT DOCUMENTS

| | | | |
|---|---|---|---|
| 4,970,665 | 11/1990 | Doi et al. | 395/785 |
| 5,434,962 | 7/1995 | Kyojima et al. | 395/774 |
| 5,438,657 | 8/1995 | Nakatani | 395/767 |
| 5,513,323 | 4/1996 | Williams et al. | 395/200.18 |
| 5,557,785 | 9/1996 | Lacquit et al. | 395/615 |

OTHER PUBLICATIONS

Oda (Office Document Architecture) by ISO 8613 Jun. 15, 1993.

Goldfarb, "Annex B: Basic Concepts," *The SGML Handbook*, Oxford, 1990, pp. 18–65, 1990.

*Primary Examiner*—Joseph H. Feild
*Assistant Examiner*—Jae Hee Choi
*Attorney, Agent, or Firm*—Oliff & Berridge, PLC

[57] ABSTRACT

A document database management apparatus is disclosed for managing a database composed of a plurality of documents. The document database management apparatus includes a generating regulation management section for holding a regulation to generate a logical structure of a document in the database from a logical structure of the document to be stored in the database, a document generating section for generating a document in the database from the document to be stored in accordance with the regulation stored in the generating regulation management section, and a document management section for storing a document generated by the document generation section in the database.

4 Claims, 11 Drawing Sheets

| ITEM | ACTION |
|---|---|
| DOCUMENT ARCHITECTURE | ODA |
| NAME | ODA-to-SGML |
| TAG NAME | TO MAKE FROM AN OBJECT CLASS |
| START TAG | YES |
| END TAG | YES |

| ITEM | ACTION |
|---|---|
| DOCUMENT ARCHITECTURE | ODA |
| NAME | ODA-to-Text |
| TAG NAME | NO |
| START TAG | NO |
| END TAG | NO |

FIG. 9

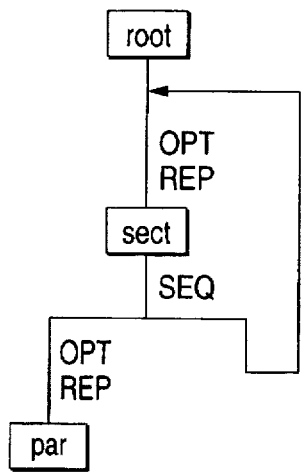

FIG. 10

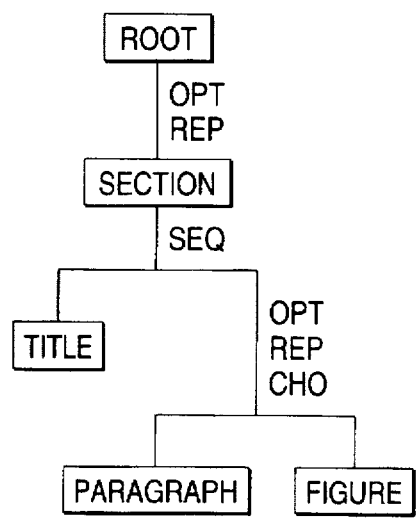

FIG. 11

| REGULATION NO. | CONDITION | ELEMENT TYPE |
|---|---|---|
| REGULATION 1 | ELEMENT TYPE IS root. | ROOT |
| REGULATION 2 | ELEMENT TYPE IS sect, AND PARENT ELEMENT TYPE IS root. | SECTION |
| REGULATION 3 | ELEMENT TYPE IS par, AND GRANDFATHER (PARENT OF PARENT) ELEMENT TYPE IS sect. | PARAGRAPH |
| REGULATION 4 | ELEMENT TYPE IS par, AND THERE ARE NO ELDER BROTHER ELEMENTS. | TITLE |
| REGULATION 5 | ELEMENT TYPE IS par. | PARAGRAPH |

FIG. 12
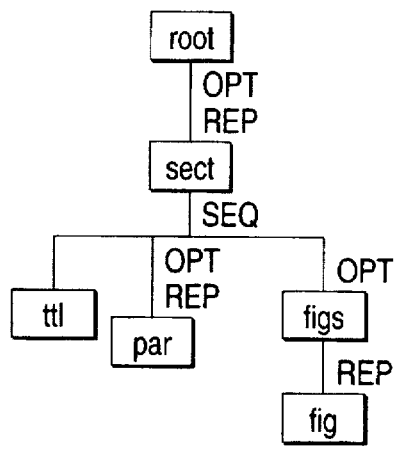
FIG. 13
| REGULATION NO. | CONDITION | ELEMENT TYPE |
|---|---|---|
| REGULATION 1 | ELEMENT TYPE IS root. | ROOT |
| REGULATION 2 | ELEMENT TYPE IS sect. | SECTION |
| REGULATION 3 | ELEMENT TYPE IS ttl. | TITLE |
| REGULATION 4 | ELEMENT TYPE IS par. | PARAGRAPH |
| REGULATION 5 | ELEMENT TYPE IS fig. | FIGURE |
FIG. 14
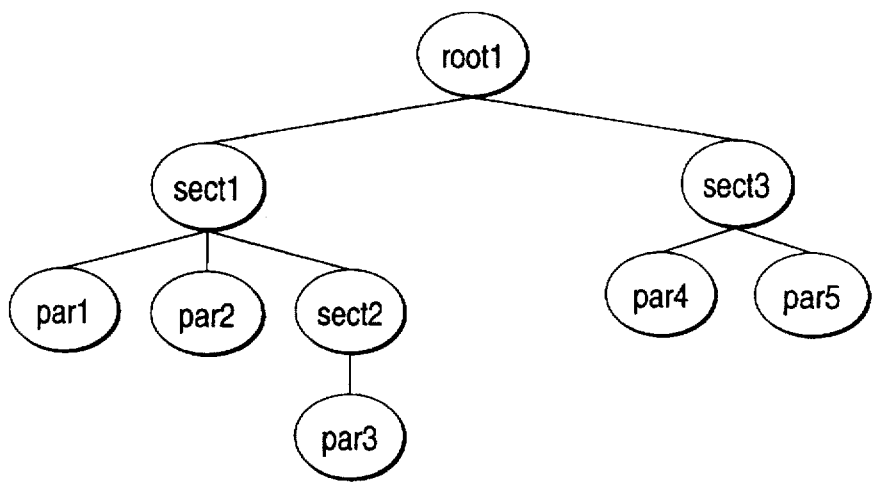

FIG. 18
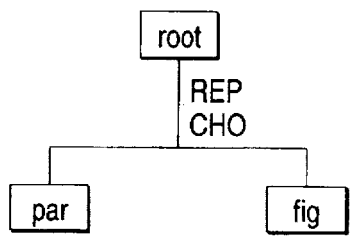
FIG. 19
| REGULATION NO. | CONDITION | ELEMENT TYPE |
|---|---|---|
| REGULATION 1 | ELEMENT TYPE IS ROOT. | root |
| REGULATION 2 | ELEMENT TYPE IS TITLE. | par |
| REGULATION 3 | ELEMENT TYPE IS PARAGRAPH. | par |
| REGULATION 4 | ELEMENT TYPE IS FIGURE. | fig |
FIG. 20
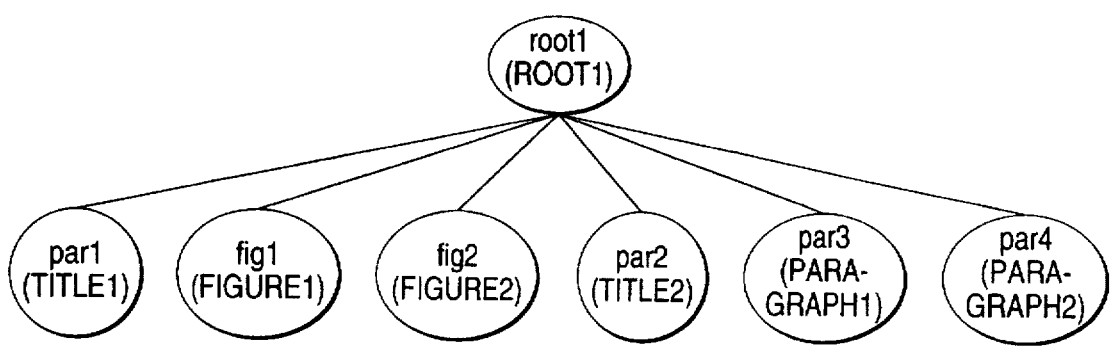

5,802,529

APPARATUS AND METHOD FOR DOCUMENT DATABASE MANAGEMENT OF DOCUMENTS HAVING A PLURALITY OF DOCUMENT STRUCTURES

BACKGROUND OF THE INVENTION

1. Field of the Invention

The present invention relates to a document database management apparatus to manage electronic documents.

2. Description of the Related Art

Electronic documents made by word processors and other apparatus are expressed in the form of digital data. Therefore, they can be easily edited, that is, they can be easily added, erased and changed so that the documents can be effectively drawn up and used. When a plurality of electronic documents are stored in a storage of a large capacity so as to compose a document database apparatus, it is possible to electronically retrieve an objective document, for example, by means of key word retrieval.

When a document is retrieved by a conventional document database management apparatus in which electronic documents are managed, document data made by word processors are stored as they are and retrieval is conducted with the stored data.

On the other hand, in order to make it easy to create and edit an electronic document, it is common to structure the electronic document. The structure of a document is represented by elements such as a chapter, title and paragraph, and also represented by information showing relations among the elements, for example, a chapter has a title and paragraph as a subordinate structure.

The task to be solved by the present invention will be explained below, referring to ODA (Office Document Architecture by ISO 8613) and SGML (Standard Generalized Markup Language by ISO 8879 and JIS X4151).

First, the technical terminologies used in this specification will be explained as follows.

"Logical structure" is defined as a structure of data to define the logical structure of a document.

"Document architecture" is defined as an information structure to express a document. For example, the information structure stipulated by ODA is a document architecture. The information structure stipulated by a subset of SGML that defines character codes to be used and information structure for graphs, for example, is a document architecture as well. Concerning SGML, refer to "Instruction to SGML" by Martin Bryan published by Addison Wesley Publishing Company Inc.

"Document class" represents a template of a document. A "Document class" determines permissible logical structures of a document to be made, that is, "document class" determines the types of nodes which appear in the logical structure, the attribute of each node and the subordinate structure of each node. Examples of "document classes" are generic logical structures of ODA, and DTDs (Document type definition) in subsets of SGML that define document architectures.

Next, problems caused when documents structured in the above manner are retrieved will be explained below.

The first problem is described as follows. At present, electronic documents of various document architectures and document classes are in circulation. Therefore, types of document data are different, so that it can be impossible to conduct the retrieval of an entire document or to extract an element, and the retrieval efficiency is lowered.

For example, in the case of SGML, in some cases, a tag for showing a punctuation of the logical structure is omitted by the minimization. List 1 shows an example including an entity reference in which tag minimization is used.

LIST 1: Example Including an Entity Reference

```
< !doctype doc
 |
 < !element doc - - (p+) >
 < !element p - O (#PCDATA) >
 < !entity equal "=" >
 | >
 <doc>
    <p> Ê ¸ ½ $#241; &equal; document.</doc>
```

The following portion on List 1 is the designation of a document type (DTD) named doc, and a portion surrounded by brackets [ ] is a DTD.

```
< !doctype doc
 |
 < !element doc - - (p+) >
 < !element p - O (#PCDATA) >
 < !entity equal "=" >
 | >
```

By the declaration of <!element doc - - (p+)> in the DTD, it is shown that the element "doc" has a simple structure in which the element "p", the number of which is not less than 1, is repeated.

By the declaration of <!element p-O (#PCDATA)>, it is shown that the element "p" has a text.

A portion surrounded by <doc> and </doc> is a document instance.

Before the explanation of the instance shown on List 1, an example of another instance generated in accordance with the document type "doc" is shown below.

```
<doc>
<p> This is the first paragraph. </p>
<p> This is the second paragraph. </p>
<p> This is the last paragraph. </p>
</doc>
```

In this case, <doc>, </doc>, <p>and </p> are referred to as a tag, which is used for showing a punctuation of the element. Both <doc> and <p> are referred to as a start tag, from which the description of the entity starts. </doc> and </p> are referred to as an end tag, at which the description of the entity ends. A portion surrounded by <doc> and </doc> is the instance of "doc". A portion surrounded by <p>and </p> is the element of "p". Accordingly, it can be understood that a document instance having 3 paragraphs are described in this example.

In this connection, it is declared that the end tag of "p" can be omitted in this DTD, which is designated by an "O" in <!element p-O (#PCDATA)>. Accordingly, it is possible to express the above instance as follows.

```
<doc>
<p> This is the first paragraph.
<p> This is the second paragraph.
<p> This is the last paragraph.
</doc>
```

In this case, it is declared that the entity reference "&equal;" in the instance is developed into a line of characters of "=" when the instance is analyzed by an SGML parser (processing system) using <!entity equal"=">.

In this case, Ê ¸ ½ ñ in the instance on List 1 are referred to as a character reference in which characters are referred by codes. In this case, the character code, the value between &# and; of which is 1 byte, is described by the decimal system. They are expanded when the instance is analyzed by the SGML parser.

On List 1, the end tag of the element "p" is omitted. The original logical structure is not obvious, that is, the logical structure, in which the end tag of the element "p" is not omitted, is not obvious. Accordingly, when this document is stored as it is, this element can not be extracted in some cases. An example in which the end tag of the element "p" is not omitted will be shown on List 2 later.

When the tags are dynamically supplied so that the tags can be fully attached, there is no possibility of an oversight of retrieval, however, the cost of retrieval is raised.

In the above SGML, there is no standard character code, but the character code by which the document is described is determined by the SGML declaration which is one of the elements of the document. Accordingly, the character code is different for each document. Since the document instance, which is an actual content of the SGML document, includes an entity reference, there is a possibility of an oversight of retrieval in the case of the full-test unless the entity reference is expanded. When the character code of the document is converted and the character reference and entity reference are expanded at a point of time of retrieval, it is possible to prevent an oversight of retrieval so that all the documents of interest can be retrieved. However, it takes time for the preparation of retrieval, and the retrieval efficiency is lowered.

List 2 shows an example (only an instance) in which the entity reference of the document on List 1 is developed so that the tags can be fully attached.

---

List 2: Example in which the entity reference is developed so that the tags can be fully attached

```
<doc>
       <p> document = document.</p>
</doc>
```

---

The second problem is described as follows. Frequently, there is a difference between the document structure expressed by the document class and the document structure intended by a user who writes a document using the document class. Accordingly, it is difficult to designate an expression for correctly retrieving an intended object. These problems caused in the retrieval will be explained, referring to Lists 3 and 4.

---

List 3: Example of DTD

```
<!doctype art1
[
!element art1 - - (section +) >
<!element section - O (para +) >
<!element para - O (#PCDATA) >
]>
```

List 4: Example of DTD

```
<!doctype art2
[
!element art2 - - (section +) >
<!element section - O (title para +) >
<!element para - O (#PCDATA) >
]>
```

---

DTD (Document Type Definition) on List 3 is a document composed of sections, and the sections are composed of paragraphs. DTD on List 4 is also composed of sections, however, the sections on List 4 are composed of a title and a paragraph. Therefore, on List 4, it is possible to designate the retrieval condition with respect to the content of the title. However, in order to conduct the same retrieval on List 3, it is necessary to designate a retrieval condition with respect to the first paragraph of the section.

The third problem will be described as follows. When documents of various document classes are used as they are, even if they originally have the same structure and meaning, it is necessary to write retrieval expressions, the number of which is the same as that of the document classes to be retrieved. Accordingly, it takes much labor and time for retrieving the document intended by a user. Referring to Lists 5 and 6, this problem will be explained below.

---

List 5: Example of DTD

```
< !doctype base
[
< !element base - - (title, author, section +) >
< !element title - O (#PCDATA)
>
< !element author - O (#PCDATA) >
< !element section - O (secttl, para +)
> < !element settl - O (#PCDATA) >
< !element para - O (#PCDATA) >
]>
```

List 6: Example of DTD

```
< !doctype derived
[
<!element derived - - (front, body, back) > < !element front -
- (title author) >
< !element title - O (#PCDATA) >
< !element author - O (#PCDATA) >
< !element body - O (section +) >
< !element section - O (secttl, para +)
> < element secttl - O (#PCDATA)>
< !element para - O (#PCDATA)
< !element back - O (ack) >
< !element ack - O (#PCDATA) >
]>
```

---

DTD on List 5 is a document class having a structure composed of a title, author and section. DTD on List 6 is a document class having a structure composed of a front, body and back. The front is composed of a title and author, the body is composed of a section, and the back is composed of an acknowledgment. These two DTDs are document classes expressing common articles. For example, when the search condition is that the author is a specific person, it is possible to retrieve documents of the two at the same time. However, according to the conventional document database management apparatus, each type of documents should be retrieved separately.

As described above, according to the conventional document database management apparatus, the data of a document is stored as is, and retrieval is conducted using the information carried by the document data. Accordingly, various problems are caused, for example, there is an oversight of retrieval, it is difficult to designate an expression by which an intended object can be correctly retrieved, and it takes much labor and time for retrieving a document intended by a user.

SUMMARY OF THE INVENTION

It is an object of the present invention to provide a document database management apparatus and a method thereof by which objective document data can be positively retrieved without conducting a complicated retrieving work.

In order to solve the above problems, the present invention is to provide a document database management apparatus in which a database composed of a plurality of documents is managed. The document database management apparatus comprises: a regulation holding means for holding a regulation to generate a logical structure of a document in the database from a logical structure of the document to be stored in the database; a document generation means for generating a document in the database from the document to be stored in accordance with the regulation stored in the regulation holding means; and a document storage means for storing the document generated by the document generation means in the database.

In order to solve the above problems, the apparatus of the present invention comprises:

a document schema management means for storing and retrieving a document schema;

a document management means for storing, retrieving and taking out a document;

a retrieval expression designation means for designating a retrieval expression by a user;

a document class management means for storing and retrieving a document class;

a generating regulation management means for storing and retrieving a generating regulation described with the document schema and document class; and a document generation means for generating a document to be outputted from a document inputted in accordance with the generating regulation.

When a user stores a document in the database, the document management means is used. The document management means operates as follows. The document generation means generates a document of a predetermined document schema from the document to be stored, and then the document management means stores the generated document in the database.

The document generation means evaluates a generating regulation retrieved by the generating regulation management means and generates a document of a predetermined document schema from the document to be stored.

The generating regulation is retrieved in accordance with the document class and document schema of the document to be stored, they are used as a key. The generating regulation is retrieved from a group of regulations held by the generating regulation management means.

When a user retrieves a document from the database, a retrieval expression is designated by the retrieval expression designating means. The document management means evaluates the retrieval expression given by the retrieval expression designating means and retrieves a group of documents which satisfy the condition designated by the retrieval expression from the documents stored in the database. In the case where a document class of the document to be taken out is designated, a document of the predetermined document class is generated by the document generation means, and the generated document is taken out. In the case where a document class of the document to be taken out is not designated, the stored document is taken out as it is.

The above and other objects and features of the present invention will be more apparent from the following description taken in conjunction with the accompanying drawings.

BRIEF DESCRIPTION OF THE DRAWINGS

FIG. 9 is a schematic illustration showing an example of the document class.

FIG. 10 is a schematic illustration showing an example of the document schema.

FIG. 11 is a schematic illustration showing an example of the generating regulation.

FIG. 12 is a schematic illustration showing another example of the document class.

FIG. 13 is a schematic illustration showing another example of the generating regulation.

FIG. 14 is a schematic illustration showing an example of the external document of the document class shown in FIG. 9.

FIG. 18 is a schematic illustration showing an example of the internal document.

FIG. 19 is a schematic illustration showing another example of the generating regulation.

FIG. 20 is a schematic illustration showing an example of the external document.

DETAILED DESCRIPTION OF THE PREFERRED EMBODIMENTS

Referring to an embodiment shown in the accompanying drawings, the present invention will be specifically explained as follows.

Figure 1:
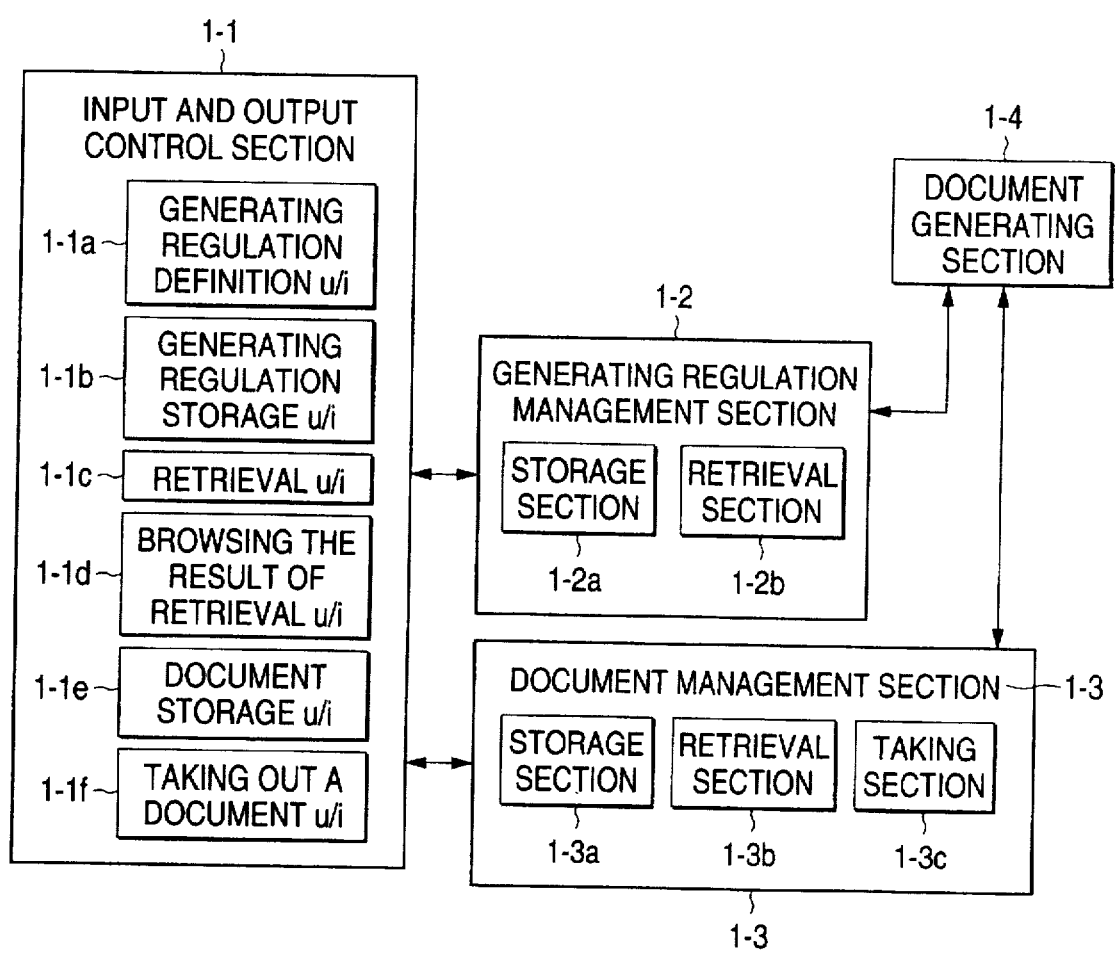
FIG. 1 is an arrangement view of the document database management apparatus of the first embodiment of the present invention.

FIG. 1 is an arrangement view of the document database management apparatus of the first embodiment of the present invention.

The document database management apparatus of this embodiment manages a document of a plurality of document architectures.

The function of the document database management apparatus of this embodiment will be briefly explained below.

In the document database management apparatus of this embodiment, it is possible to store, retrieve and take out a document. Also, in the document database management apparatus of this embodiment, it is possible for a user to define and register a generating regulation for generating a logical structure of a document. Also, it is possible for the user to retrieve a document according to the generated logical structure.

When a document is stored, a document is generated from the document to be registered. In this case, the document to be registered is referred to as an external document in this specification, hereinafter, and the generated document is referred to as an internal document in this specification, hereinafter. The result of generation is stored in the document database management apparatus together with the external document and an identifier which is unique in the document database management apparatus. In the discussion of the document database management apparatus of this embodiment, a pair of an external document and the internal document generated from the external document will be referred to as a document in this specification, hereinafter.

In the document database management apparatus of this embodiment, it is possible to define a generating regulation for generating an internal document from an external document.

In the case of retrieval of a document, the internal document is used. As a result of the retrieval, a set of identifiers of the document to satisfy the retrieving condition can be obtained.

It is possible for the user to browse the internal document of the document having the identifier contained in the result of the retrieval.

It is also possible for the user to take out an external document of the document having the identifiers contained in the result of the retrieval.

In this embodiment, the form of an internal document is a text. Depending upon the definition of the generating regulation, the generated text becomes an instance of SGML.

FIG. 1 is a block diagram showing an arrangement of the document database management apparatus of the first embodiment of the present invention.

In FIG. 1, reference numeral 1-1 is an input and output control section for the communication between the user and the document database management apparatus of this embodiment. The input and output control section 1-1 includes: a generating regulation definition user interface (shown by u/i in the drawing) 1-1a for defining a generating regulation; a generating regulation storing user interface 1-1b for storing a generated regulation; a document storing user interface 1-1e for storing a document; a retrieval user interface 1-1c for defining and executing a retrieval expression; a retrieval result browsing user interface 1-1d for the user to examine the result of retrieval; and a document taking user interface 1-1f for taking out an external document of the document obtained as a result of retrieval.

Reference numeral 1-2 is a generated regulation management section for managing a generating regulation. In the generating regulation management section 1-2, the generating regulation is stored together with a document architecture name to which the regulation is applied. The generating regulation management section 1-2 includes: a storing section 1-2a for storing a generating regulation; and a retrieval section 1-2b for retrieving the generating regulation.

Reference numeral 1-3 is a document management section for managing a document. The document management section 1-3 includes: a storage section 1-3a for storing a document; a retrieval section 1-3b for retrieving a document; and a document taking section 1-3c for taking out a document.

Reference numeral 1-4 is a document generating section for generating an internal document in accordance with an external document.

(Storage of Documents)

The following is a description of the operation of storing a document in the above database management apparatus.

When a document is stored, a user operates the input and output control section 1-1, so that the external document to be stored, the architecture name of the external document and the generating regulation name used for generating an internal document can be designated. This designation is referred to as a storage designation.

The storage designation is sent to the document management section 1-3. From the document management section 1-3, the storage designation is sent to the document generating section 1-4.

In the document generating section 1-4, an internal document is made in accordance with the storage designation. Referring to the flow charts shown in FIGS. 2 and 3, the detail of making the internal document is explained as follows.

It is confirmed whether the generating regulation designated by the storage designation exists or not (step 2-1 and 2-2). In this confirmation, the generating regulation is retrieved by the name for confirmation. When it is confirmed that the generating regulation does not exist, the document storage fails. In this case, error processing is conducted (step 2-8) and the storage process is terminated.

When the generating regulation exists, it is taken out from the generating regulation control section 1-2, and an internal document is made (step 2-3). In the case of a failureof making the internal document, storage of the document fails. In this case, error processing is conducted (step 2-8), and the storage process is terminated.

Figures 4, 5, 6:
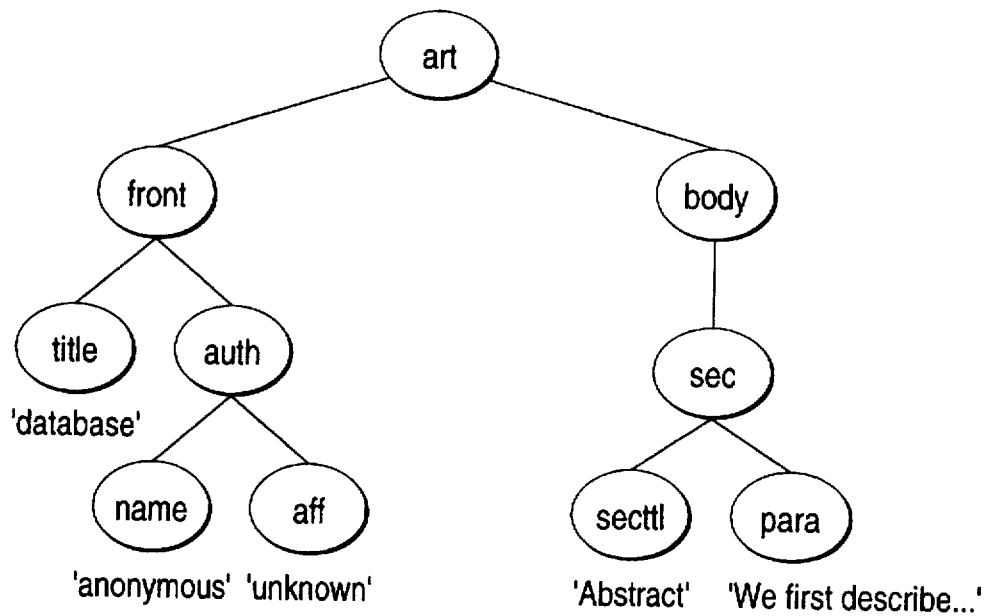
FIG. 4 is a schematic illustration showing an example of the generating regulation.
FIG. 5 is a schematic illustration showing an example of the ODA document.
FIG. 6 is a schematic illustration showing another example of the generating regulation.

FIG. 4 shows an example of the generating regulation. It is possible to apply this regulation to a specific logical structure of an arbitrary ODA document logical structure having a generic logical structure. According to the generating regulation, the tag name is determined as follows. A logical object class, which is a node of a generic logical structure, is specified by an attribute "object class" of the logical object which is a node of the specific logical structure. Then, the value of an attribute "user-visible name" of the logical object class is used. In this case, it is described that tags not omitted here, that is, start tags and end tags are generated.

Then a root node of the external document is selected (step 2-5), and the node processing is conducted (step 2-6).

Figure 3:
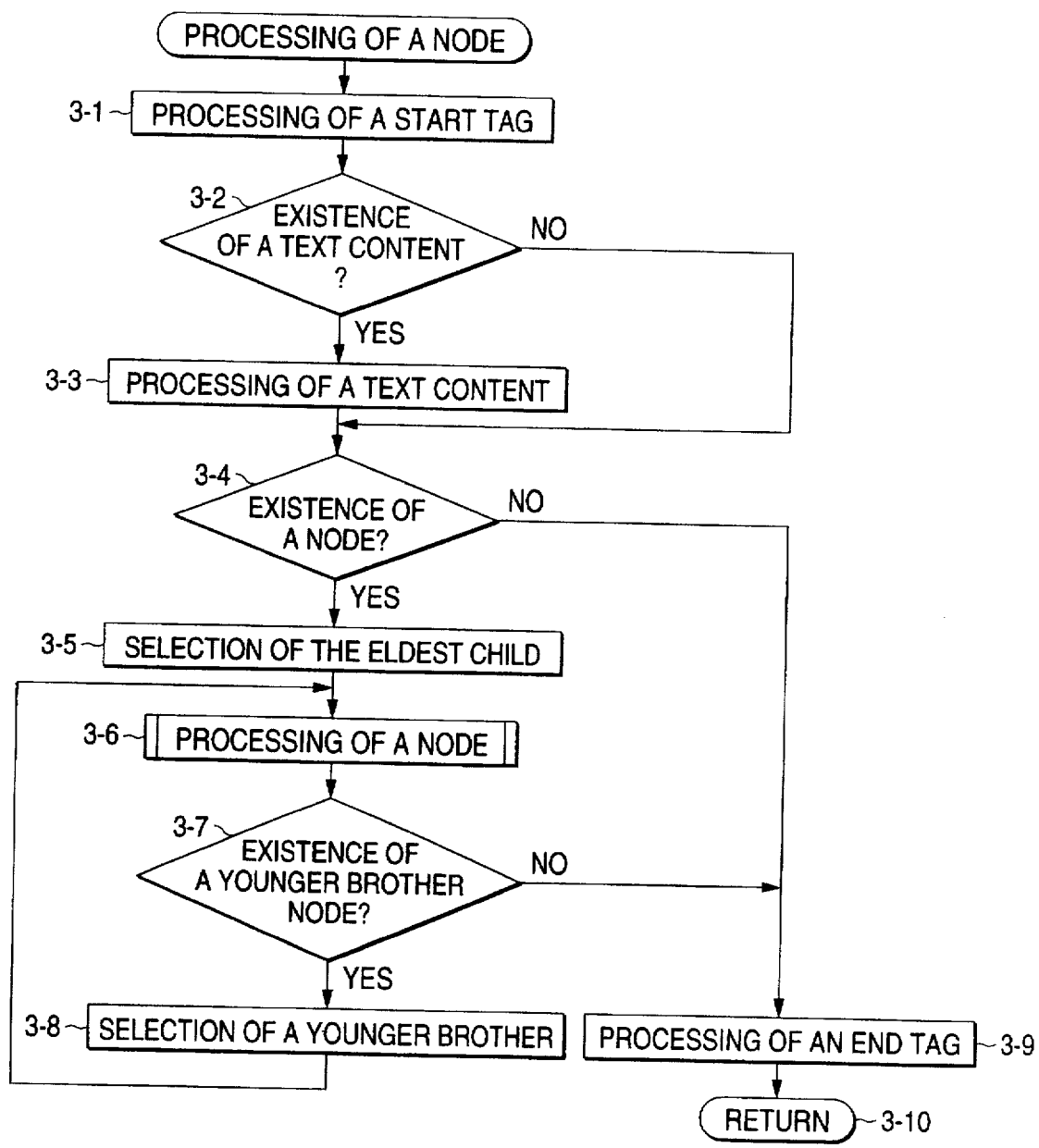
FIG. 3 is a flow chart showing the processing of a node in the process of making an internal document.

As shown in FIG. 3, the node processing is conducted while traversing the logical structure in depth-first and left-to-right order.

First, concerning the node which has been selected at present, the processing of a start tag is conducted (step 3-1). When it is described in the generating regulation that the start tag is generated, the tag name is determined by a designated method, so that the start tag is generated. When it is described in the generating regulation that the start tag is not generated, nothing is done here. When the selected node has a text content (step 3-2), it is copied as a text content of the internal document (step 3-3).

When the selected node has a child node (step 3-4), the eldest child node is selected (step 3-5), the node is recursively processed (step 3-6). When the selected node has no child node in the case where it is described in the generating regulation that the end tag is generated, the end tag is generated in accordance with the regulation (step 3-9), and the process is returned to the step where this routine was invoked (step 3-10).

When the selected node has a younger sibling node (step 3-7), it is selected (step 3-8), and then the node processing is invoked again (step 3-6). When the selected node has no younger sibling node, the end tag is generated (step 3-9) in the case where it is described in the generating regulation that the end tag is to be generated, and the process is returned to a step where this routine was invoked.

FIG. 5 is a view showing an example of the ODA document. In this example, the node is a logical object, and a label in a node is the value of the attribute "user-visible name" of the logical object directed by the node. In the case of the ODA document, when the content architecture of the content accompanying the basic logical object is character content architecture, the basic logical object has a text content. A string beside the node is a text content of the node.

In this document, the root (art) has two nodes (front and body). The front matter (front) has a title (title) and author (author). The author is composed of a name (name) and affiliation (aff). The body (body) has a section (sec), and the section (sec) has a section title (secttl) and a paragraph (para).

Figure 2:
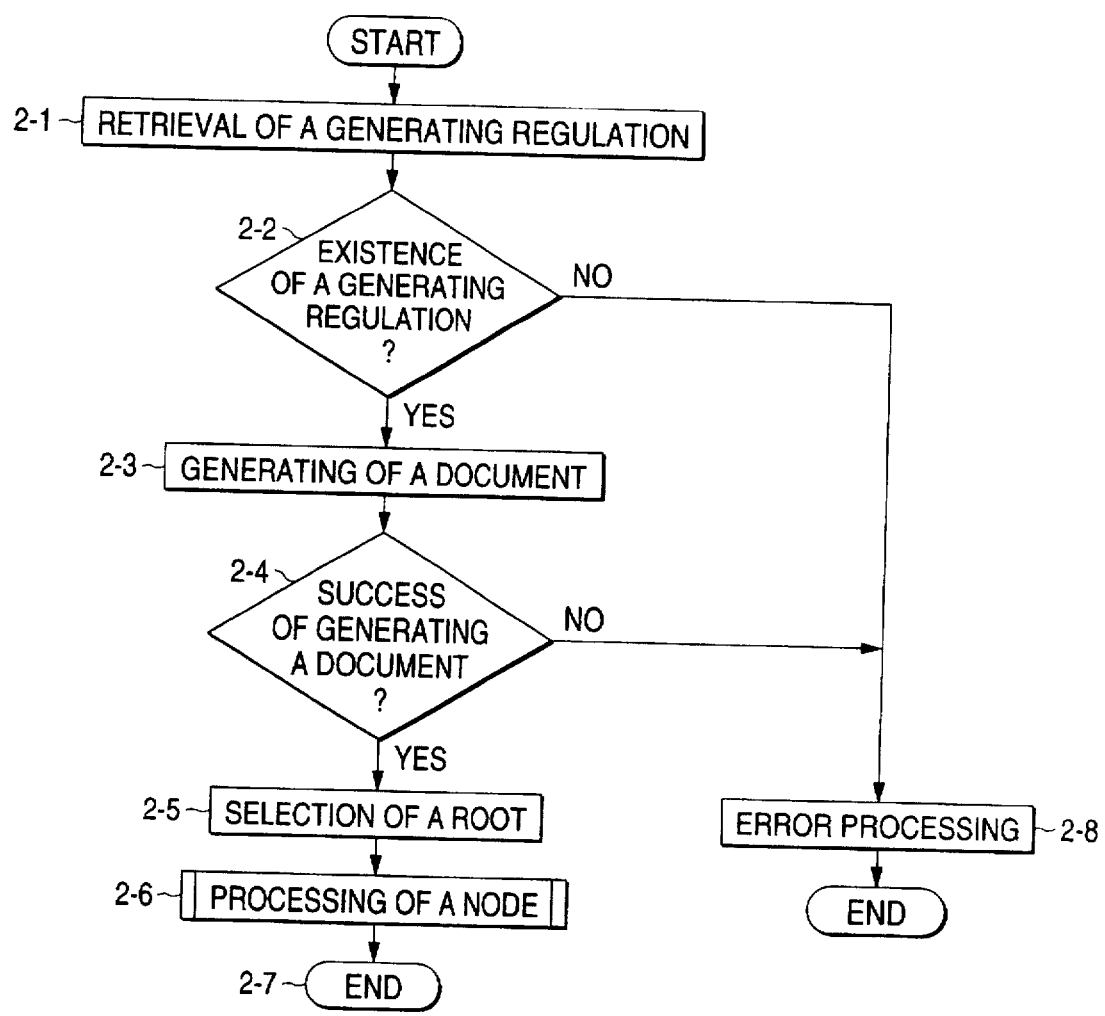
FIG. 2 is a flow chart showing the processing of making an internal document.

According to the flow charts shown in FIGS. 2 and 3, that is, the nodes of this document is processed in depth-first and left-to-right order: art, front, title, author, aff, body, sec, secttl, and para. Leaf nodes of title, name, aff, secttl and para actually have text contents. The text contents are "database", "anonymous", "unknown", "Abstract" and "We first describe" in this order.

Accordingly, when processing is conducted by the procedure shown in FIGS. 2 and 3 in accordance with the regulation shown in FIG. 4, the following SGML document is generated.

List 7: Internal document generated from the external document (ODA document) shown in FIG. 5

```
<art>
    <front>
        <title> database </title>
        <auth>
            <name> anonymous</name>
            <aff> unknown </aff>
        </auth>
    </front>
    <body>
        <sec>
            <secttl> Abstract </secttl]
            <para> We first describe
                . . . </para>
        </sec>
    </body>
</art>
```

FIG. 6 is a view showing another example of the generating regulation. According to this regulation, only the text content of the external document is extracted and the internal document is generated. List 8 shows an internal document obtained when this generating regulation is applied to the external document shown in FIG. 5.

List 8: Internal document generated from the external document (ODA document) shown in FIG. 5 database
anonymous
unknown
Abstract
We first describe . . .
(Taking Out Document)

Next, operation will be explained below when a document is taken out in the document database management apparatus of this embodiment.

When a document is taken out, an identifier of the document to be taken out, and one of the internal and the external document, or alternatively both of them are designated by the user through the input and output control section 1-1. This operation is referred to as a taking-out-designation.

The taking-out-designation is sent to the document management section 1-3 and one of the internal and the external document or both of them are taken out by the document management section 1-3.

Figure 7:
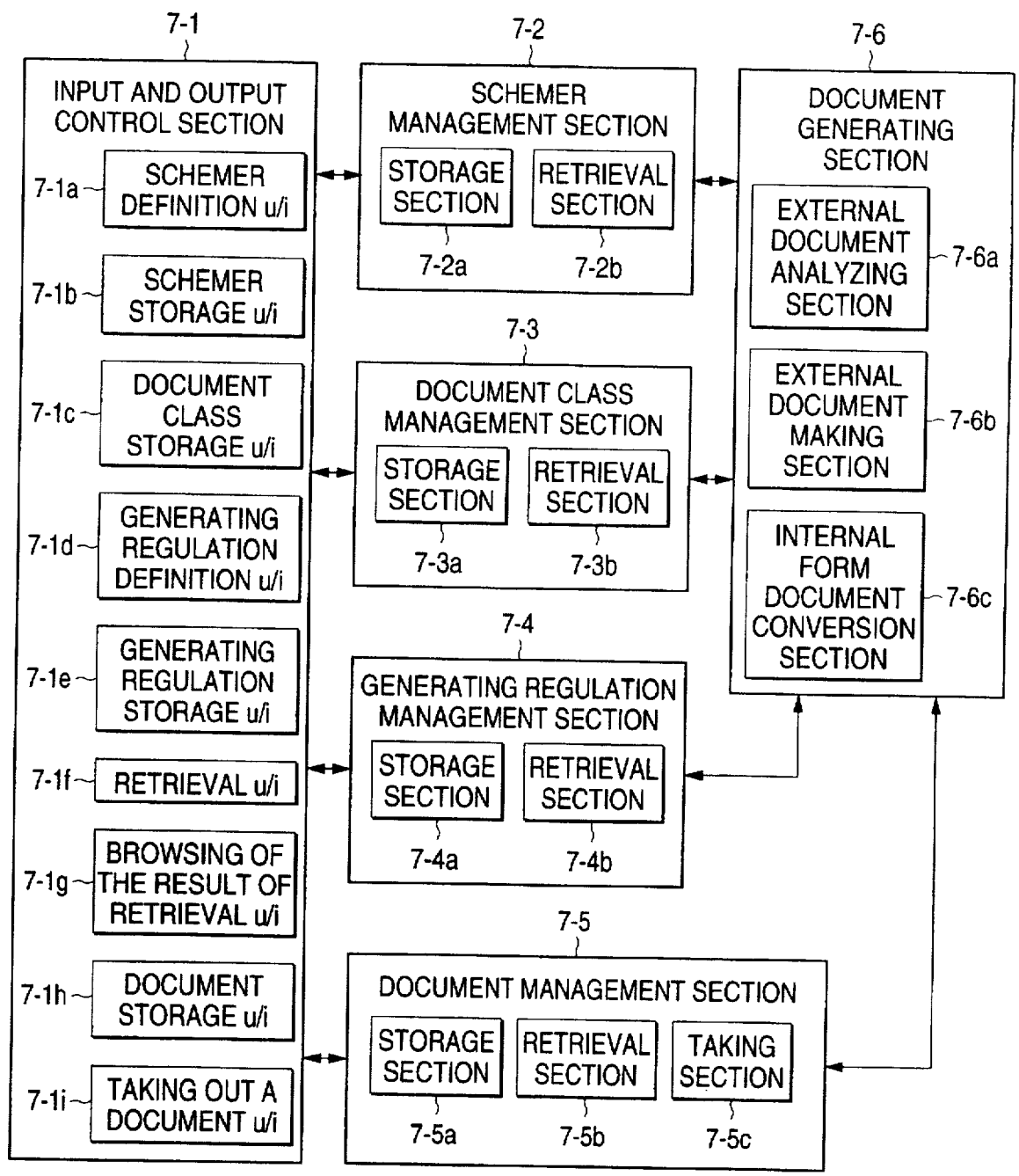
FIG. 7 is an arrangement view of the document database management apparatus of the second embodiment of the present invention.

FIG. 7 is an arrangement view of the document database management apparatus of the second embodiment of the present invention.

The function of the document database management apparatus of the second embodiment of the present invention will be briefly explained as follows.

By the document database management apparatus of the second embodiment of the present invention, it is possible to store, retrieve and take out a document having a document class, the framework of the logical structure of which is defined. Also, by the document database management apparatus of the second embodiment of the present invention, it is possible for the user to define and register the framework of the logical structure of the document as a document schema. According to the registered document schema, it is possible to retrieve the documents using the registered document schemata.

When a document is stored, a document conforming to one of the registered document schema (this document will be referred to as an internal document hereinafter) is generated from the document to be registered (this document will be referred to as an external document hereinafter). The result of generation is stored together with the external document and an identifier which is unique in the document database management apparatus. In the discussion of the second document database management apparatus, a pair of an external document and the internal document generated from the external document will be referred to as a document in this specification, hereinafter.

In order to generate an internal document from an external document, the document class of the external document can be registered. Also, it is possible to define and register a regulation for generating an internal document of a specific document schema from an external document of a specific document class. This regulation is referred to as a generating regulation, hereinafter.

When a document is retrieved, retrieval is conducted using an internal document. As a result of retrieval, it is possible to obtain a set of identifiers of documents satisfying a retrieval condition.

It is possible for a user to browse an internal document corresponding to the identifier obtained as a result of retrieval. It is also possible to take out an external document corresponding to the identifier obtained as a result of retrieval. It is also possible to generate an external document of a registered document class from an internal document and take out the result. It is possible to define and register a generating regulation for generating an external document of a registered document class from an internal document of a specific document schema.

In FIG. 7, reference numeral 7-1 is an input and output control section for the communication between the user and the document database management apparatus of this embodiment. The input and output control section 7-1 includes: a document schema definition user interface (shown by u/i in the drawing) 7-1a for defining a document schema; a document schema storing user interface 7-1b for storing a document schema; a document class storing user interface 7-1c for storing a document class; a generating regulation definition user interface 7-1d for defining a generating regulation; a generating regulation storing user interface 7-1e for storing a generating regulation; a document storing user interface 7-1h for storing a document; a retrieval user interface 7-1f for defining a retrieval expression and retrieving; a retrieval result browsing user interface 7-1g for a user to see the retrieval result; and a document taking user interface 7-1i for taking out an external document of the document obtained as a result of retrieval.

Reference numeral 7-2 is a document schema management section for managing a document schema. In the document schema management section 7-2, a document schema is stored together with its name. The document schema management section 7-2 includes a storing section 7-2a for storing a document schema, and a retrieval section 7-2b for retrieving a document schema.

Reference numeral 7-3 is a document class management section for managing a document class. In the document class management section 7-3, a document class is stored together with its name. The document class management section 7-3 includes a storing section 7-3a for storing a document class, and a retrieval section 7-3b for retrieving a document class.

Reference numeral 7-4 is a generating regulation management section for managing a generating regulation. In the generating regulation management section 7-4, a generating regulation is stored together with the name of a document class to which the regulation is applied, the name of a document schema to which the regulation is applied, and the designation to designate whether the generating regulation is for storing or taking out. The generating regulation management section 7-4 includes a storing section 7-4a for storing a generating regulation, and a retrieval section 7-4b for retrieving a generating regulation.

Reference numeral 7-5 is a document management section for managing a document. The document management section 7-5 includes: a storing section 7-5a for storing a document; a retrieval section 7-5b for retrieving a document; and a taking section 7-5c for taking out a document.

Reference numeral 7-6 is a document generating section for generating an internal document from an external document and generating an external document from an internal document. The document generating section 7-6 includes: an external document analysis section 7-6a for analyzing the document structure of an external document and making a document, the form of which is the same as that of an internal document (this form is referred to as an internal form); an external document making section 7-6b for making an external document from a document of the internal form; and an internal form document conversion section 7-6c for making a new internal form document from an existing internal form document in accordance with the generating regulation.

(Storage of Document)

Next, operation of the database management apparatus of the above second embodiment in the case of storing a document will be explained as follows.

When a document is stored, a user designates an external document to be stored, a document class name of the external document and a document schema name of an internal document to be generated from the external document through the input and output control section 7-1. This operation is referred to as a storing designation.

The storing designation is sent to the document management section 7-5. From the document management section 7-5, the storing designation is sent to the document generating section 7-6.

Figure 8:
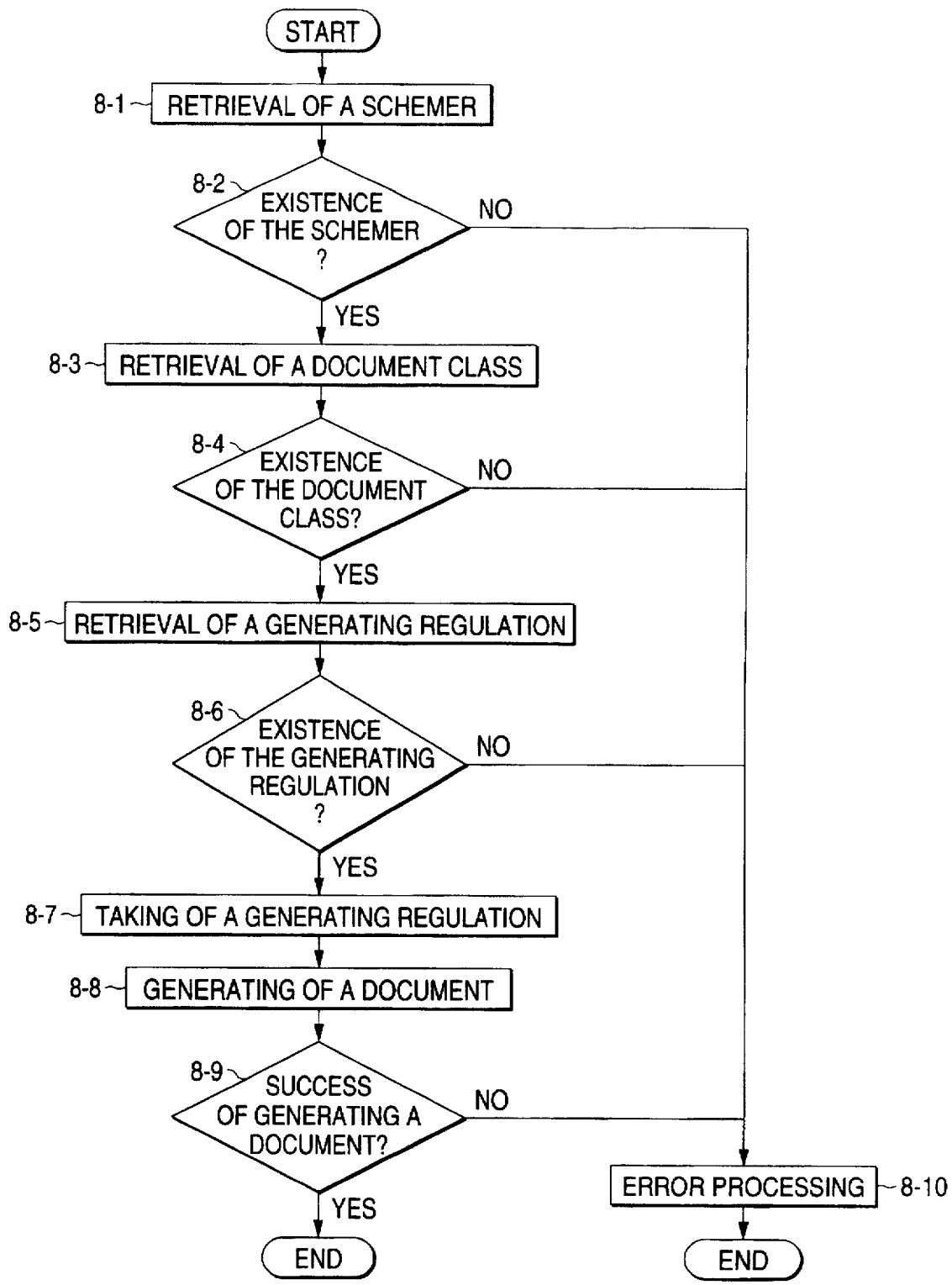
FIG. 8 is a flow chart showing the processing of making an internal document.

In the document generating section 7-6, an internal document is made in accordance with the storing designation. The detail of making the internal document is explained with reference to a flow chart shown in FIG. 8.

First, it is confirmed whether a document schema having a document schema name designated by the storing designation exists or not (steps 8-1 and 8-2). Existence of the document schema is confirmed when the document schema having the designated document schema name is retrieved in the document schema management section 7-2. When the document schema does not exist as a result of confirmation, storing the document fails. In this case, error processing is conducted (step 8-10), and the process is terminated.

After the document schema has been confirmed (step 8-2), it is confirmed whether the document class designated by the storing designation exists or not (steps 8-3 and 8-4). Existence of the document class is confirmed when the document class having the designated document class name is retrieved in the document class management section 7-3.

When the document class does not exist as a result of confirmation, storing the document fails. In this case, error processing is conducted (step 8-10), and the process is terminated.

After the existence of the document class has been confirmed (step 8-4), it is confirmed whether a generating regulation for storing having the document class name and the document schema name designated by the storing designation exists or not (step 8-5). Existence of the generating regulation for storing is confirmed when the generating regulation for storing having the designated document class name and document schema name is retrieved. When it is confirmed that the generating regulation does not exist, storing the document fails. In this case, error processing is conducted (step 8-10), and the process is terminated.

When the generating regulation exists, it is taken out from the generating regulation management section (step 8-7), and the internal document is generated (step 8-8).

In the case of a fail of generating the internal document (step 8-9), storing the document fails. In this case, error processing is conducted (step 8-10), and the process is terminated.

An internal document is generated as follows. After an external document has been analyzed by the external document analysis section 7-6a and a document of the internal form has been made, the internal document is generated from the document in the internal form by the internal form document conversion section 7-6c.

The external document analysis section 7-6a may be composed by the prior art suitable for this field in accordance with the form of the external document. For example, when the form of the external document comes within the category of LL(1) grammar, it is possible to use the technique of recursive descent parsing techniques described on pp 137 to 144 of "Programming Language Processing System of Software Science 5 of Iwanami Chair" by Masataka Sassa published by Iwanami Shoten.

In the internal form document conversion section 7-6c, the overall internal form document is converted when the conversion of the root element of the internal form document made by the external document analysis section 7-6a is recursively carried out. Referring to a flow chart shown in FIG. 21, conversion processing of the element will be explained in detail.

Processing of the element is started when one element, which has already been generated, of the internal form document, which is being generated, is used as a Parent Node. In the case where the element to be processed is the root, the processing is started while the Parent Node is undecided. According to the generating regulation, the type of an element after conversion of the element to be processed is determined (step 21-1). When the type of an element can not be determined (step 21-2), in the case where the element which is being processed is a root (step 21-7), generation of the document structure becomes an error (step 21-8). When the element which is being processed is not a root, a child element of the element concerned is processed (step 21-9).

After the element type has been determined (step 21-2), the element of this type is generated (step 21-3). After a new element has been generated, when the element which is being processed is not a root (step 21-4), the generated element is connected with the Parent Node as the youngest child (step 21-5). When the element which is being processed is a root (step 21-4), the generated element is not connected with the Parent Node. An element generated after that is employed as a new Parent Node (step 21-6).

When the element which is being processed has no child element (step 21-9), the process is returned to a step where this routine was invoked (step 21-14). When the element which is being processed has a child element (step 21-9), the eldest child of the element which is being processed is selected (step 21-10), and the selected element is recursively processed (step 21-11). The Parent Node on the invoked processing is the same as the Parent Node in the invoking processing at the point of time of calling. After that, when the element which is being processed has no younger sibling elements (step 21-12), the process is returned to a step where this routine was called (step 21-14). When the element which is being processed has a younger sibling element (step 21-12), the younger brother right after the element which is being processed is selected (step 21-13), and the selected element is recursively processed (step 21-11). The Parent Node in this called processing is the same as the Parent Node in the calling processing at the point of time of calling. FIG. 9 is a view showing an example of the document class which is stored in the document class management section of the document database management apparatus of this embodiment, wherein the document class is stored as a name of "document class C1". Characters surrounded by a rectangular represent the type of an element which appears in the document structure. Links and marks of OPT, REP, CHO and SEQ, which connect the elements, restrict a tree-structure of the document structure. The meaning of the marks is the same as that described in "ISO/IS 8613, Information Processing—Text and Office System—Office Document Architecture (ODA) and Interchange Format, Part 2, Annex B". The outline is explained as follows. OPT shows that the subordinate structure appears at most once. REP shows that the subordinate structure appears at least once. CHO shows that one of the structures shown immediately below appears. SEQ shows that all the structures shown immediately below appear in the order illustrated here.

FIG. 10 is a view showing an example of the document schema which is stored in the document schema management section of the document database management apparatus of this embodiment, wherein the document schema is stored as a name of "document schema S". The meaning of the content of FIG. 10 is the same as that of FIG. 9.

FIG. 11 is an example of the generating regulation. The generating regulation is used for generating an internal document of the document schema shown in FIG. 10 from an external document of the document class shown in FIG. 9. In the generating regulation management section 7-4, this generating regulation is stored together with a document class name of "document class C1", a document schema name of "document schema S" and information showing that the generating regulation is used for storing.

The generating regulation is a sequence of regulations including: a conditional section showing a condition about the element of an internal form document; and an element type section showing the element type in a newly generated internal form document to which elements satisfying the condition becomes. The generating regulation 1 in FIG. 11 shows that an element of the existing internal form document, the element type of which is "root", becomes an element, the element type of which is "ROOT", in a newly generated internal form document. The generating regulation is used to determine element type in step 21-1 shown in FIG. 21. The type of an element is determined as follows. It is investigated in the order of the generating regulations whether or not a condition of the regulation complies with an element which is being processed, and the type of an element of the regulation which has first complied with the element which is being processed is determined to be the type of an element after conversion.

FIG. 12 is a view showing another example of the document class stored in the document class management section 7-3 of the document database management apparatus as a name of "document class C2". The meaning of FIG. 12 is the same as that of FIG. 9.

FIG. 13 is another example of the generating regulation. The generating regulation is used for generating an internal document of the document schema shown in FIG. 10 from an external document of the document class shown in FIG. 12. The generating regulation is stored in the generating regulation management section 7-4 together with a document class name of "document class C2", a document schema name of "document schema S" and information showing that the generating regulation is used for storing.

FIG. 14 is an example of the external document of the document class shown in FIG. 9. In FIG. 14, a numeral is attached to each element of the document structure so that each element can be discriminated from elements having the same type of it.

Figure 15:
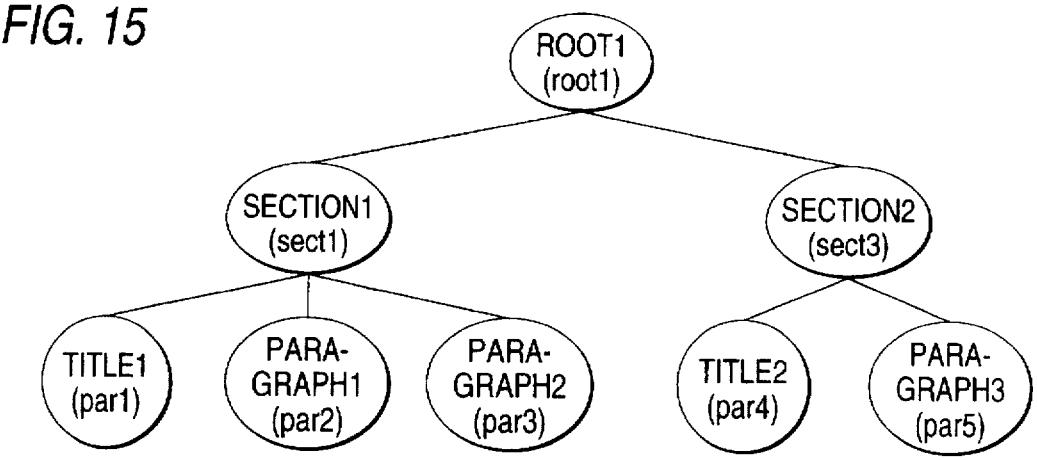
FIG. 15 is a schematic illustration showing an example of the internal document.

In the document database management apparatus of this embodiment, the storage of an external document shown in FIG. 14 is designated together with a document class name of "document class C1" and a document schema name of "document schema S". Then, according to the generating regulation shown in FIG. 11, an internal document shown in FIG. 15 is generated in the document generating section 7-6. Accordingly, in the storing section 7-5a of the document management section 7-5, a pair of the external document shown in FIG. 14 and the internal document shown in FIG. 15 are stored.

In this case, consideration must be given to the following. In FIG. 14, "sect 2", which is a child element of element "sect 1", does not satisfy any of the regulations shown in FIG. 11. Accordingly, no conversion is conducted. Then, the regulation 3 is applied to "par 3", which is a child element of element "sect 2" in FIG. 14, so that element "par 3" is converted into "PARAGRAPH 2 (par 3)" which is a child element of element "SECTION 1 (sect 1)" in FIG. 15.

In FIG. 15, a numeral is attached to each element of the internal document so that each element can be discriminated from elements having the same type of it. In FIG. 15, a mark surrounded by parentheses shows an element of the external document corresponding to the element.

Figure 16:
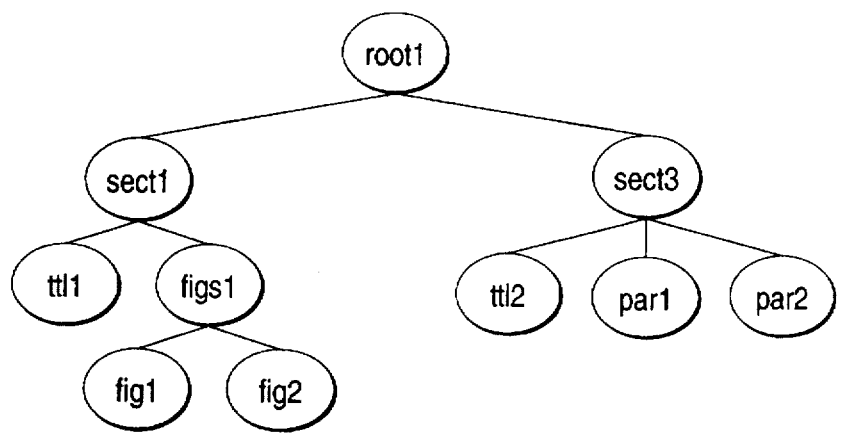
FIG. 16 is a schematic illustration showing an example of the external document of the document class shown in FIG. 12.

FIG. 16 is an example of the external document of the document class shown in FIG. 12. The meaning of FIG. 16 is the same as that shown in FIG. 14.

In the document database management apparatus of this embodiment, storage of an external document shown in FIG. 16 is designated together with a document class name of "document class C2" and a document schema name of "document schema S". Then, according to the generating regulation shown in FIG. 13, the internal document shown in FIG. 17 is generated in the document generating section 7-6, and a pair of the external document shown in FIG. 16 and the internal document shown in FIG. 17 are stored in the storing section 7-5a in the document management section 7-5.

Figure 17:
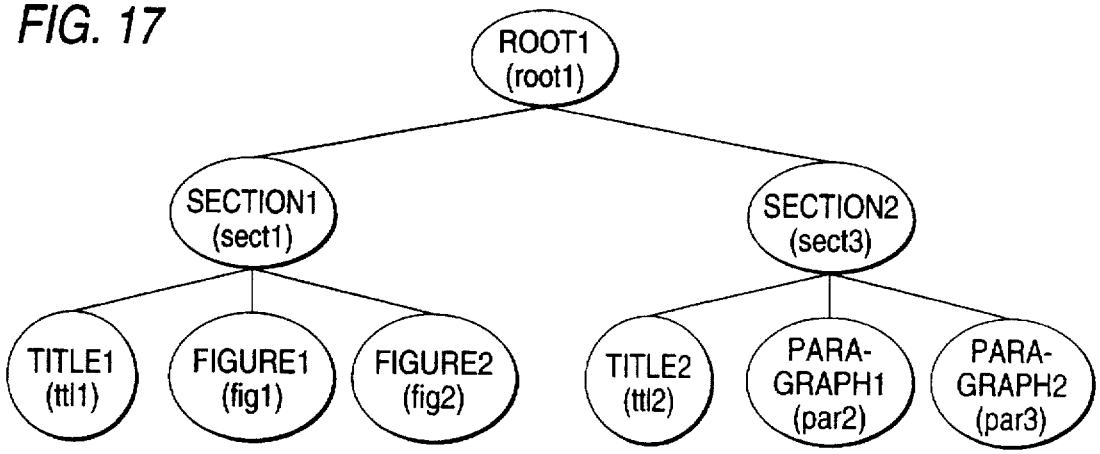
FIG. 17 is a schematic illustration showing an example of the internal document.

In FIG. 17, a numeral is attached to each element of the internal document so that each element can be discriminated from elements having the same type of it. The meaning of FIG. 17 is the same as that of FIG. 15.

In the document database management apparatus of this embodiment, even if the document classes of the external documents are different, it is possible to make the internal documents conform to be the same document schema. For example, the document class of the external document shown in FIG. 14 is different from the document class of the external document shown in FIG. 16, however, each of them is stored together with the internal document of "document schema S".

Due to the function described above, when the document structure expressed by the document class is different from the document structure intended by the user who writes the document using the document class, it is possible to specify the document conforming to a document schema which meets the intention of the user. In the case of retrieving a document, the internal document is an object of retrieval. Accordingly, even if the document classes are different, it is possible to define a retrieval expression under the condition that the document schema of the documents is the same. Therefore, it is not necessary to use a different retrieval expression for each document class.

(Taking out a Document)

The following is a description of operation of the document database management apparatus of the second embodiment when a document is taken out. In other words, operation of retrieving a document will be explained as follows.

When a document is taken out, the user operates the input and output control section 7-1, so that taking designation is designated, that is, an identifier of the document to be taken out and a document schema name of the document having the identifier are designated. When it is necessary to take out the document as an external document different from the external document corresponding to the identifier, a document class name of the external document to be taken out is added to the taking designation. The taking designation is sent to the document management section 7-5.

In the document management section 7-5, in the case where the document class is not designated by the taking designation, an external document corresponding to the identifier designated by the taking designation is sent to the input and output control section 7-1. In the case where the document class is designated by the taking designation, the taking designation is sent to the document generating section 7-6.

According to the taking designation, the document generating section 7-6 makes an external document from the internal document corresponding to the identifier designated by the taking designation.

Processing of making an external document is substantially the same as that of making an internal document. Referring to the flow chart shown in FIG. 8, processing of making an external document is explained in detail.

First, it is confirmed whether a document schema having a document schema name designated by the taking designation exists or not (steps 8-1 and 8-2). Existence of the document schema is confirmed when a document schema having a document schema name designated in the taking designation is retrieved by the document schema management section 7-2. When it is confirmed that no document schema exists, taking out a document fails. In this case, error processing is conducted (step 8-10), and the process is terminated.

After the confirmation of the document schema, it is confirmed whether or not the document class designated by the taking designation exists (steps 8-3 and 8-4). Existence of the document class is confirmed when the document class having the document name designated by the taking designation is retrieved by the document class management section 7-3.

As a result of the confirmation, when the document class does not exist, taking out the document fails. In this case, error processing is conducted (step 8-10), and the process is terminated.

After the confirmation of the document schema, it is confirmed whether or not the generating regulation for taking out having the document class name and document schema name designated by the taking designation exists (step 8-5). Existence of the generating regulation is confirmed when the generating regulation for taking out having the document class name and document schema name designated by the taking designation is retrieved by the generating regulation management section 7-4 (step 8-6). As a result of the confirmation, when the generating regulation does not exist, taking out the document fails. In this case, error processing is conducted (step 8-10), and the process is terminated.

In the case of existence of the generating regulation, it is taken out from the generating regulation management section (step 8-7), and the external document is generated (step 8-8).

In the case of a failure of making the external document (step 8-9), taking out the document fails. In this case, error processing is conducted (step 8-10), and the process is terminated.

The external document is made as follows. After a new internal form document has been generated from the internal document by the internal form document conversion section 7-6c, the external document is made from the document of the generated internal form by the external document making section 7-6b.

Figure 21:
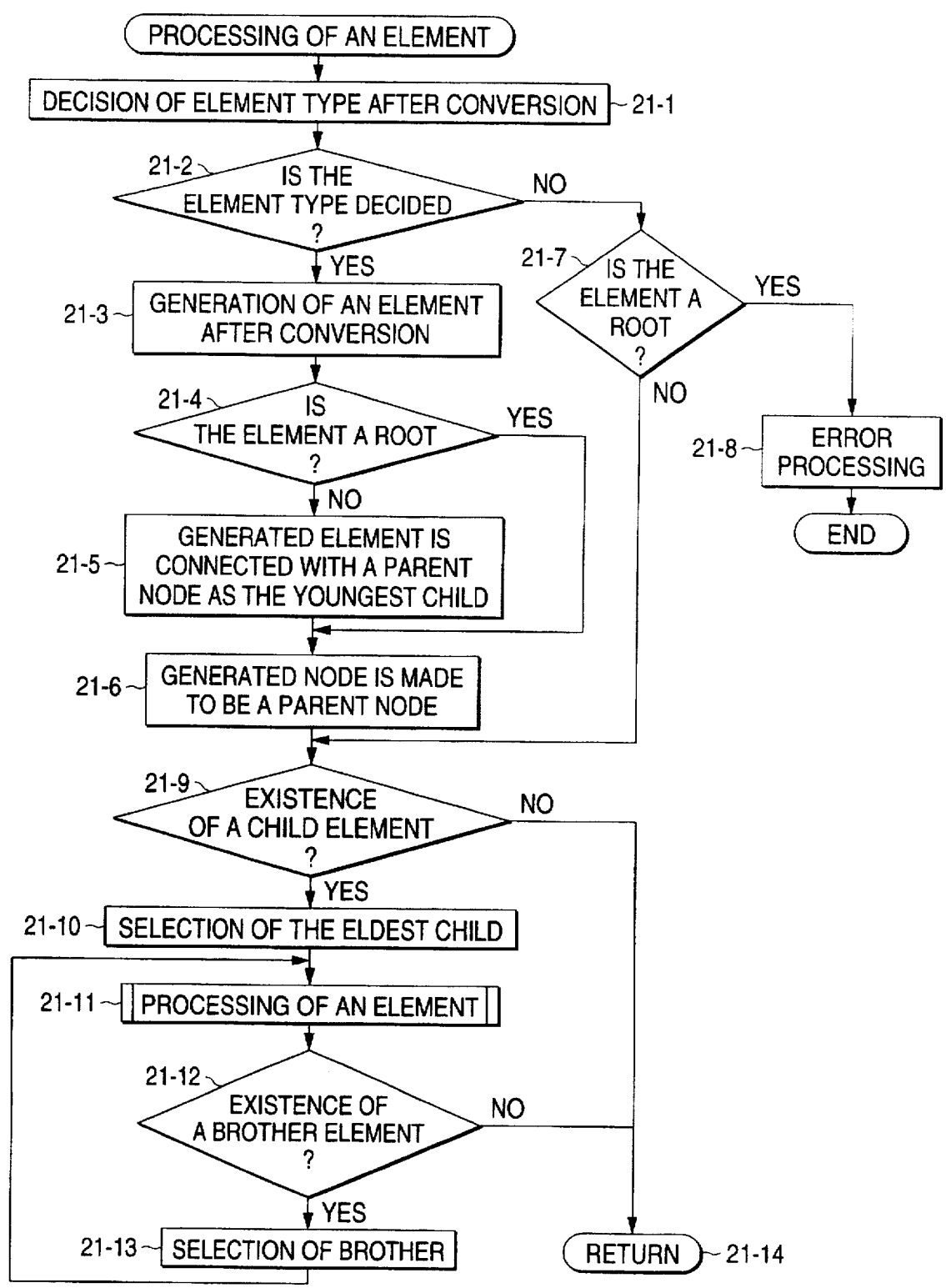
FIG. 21 is a flow chart showing the processing of elements in the conversion of an internal document.

Generation processing of the internal form document conducted by the internal form document conversion section 7-6c is the same as that shown in the flow chart illustrated in FIG. 21.

When the external document is made from the internal form document by the external document making section, it is possible to use the technique described in the first embodiment of the present invention. The external document can be generated in the following manner. In order to convert the internal form document into the external form document, generating regulations as shown in FIG. 4 can be used. The internal form document undergoes the processing shown in the flow chart of FIG. 3.

FIG. 18 is a view showing another example of the document class stored in the document class management section 7-3 of the document database management apparatus of this embodiment, wherein the document class is stored as a name of "document class C3". The meaning of the content of FIG. 18 is the same as that of FIG. 9.

FIG. 19 is a view showing another example of the generating regulation. The generating regulation is used for generating an external document of the document class shown in FIG. 18 from the internal document of the document schema shown in FIG. 10. The generating regulation is stored in the generating regulation management section 7-4 together with a document class name of "document class C3", a document schema name of "document schema S" and information showing that the generating regulation is used for taking out.

In the document database management apparatus of this embodiment, when the taking out of a document having the internal document shown in FIG. 17 is designated together with a document class name of "document class C3" and a document schema name of "document schema S", the external document shown in FIG. 20 is generated by the document generating section in accordance with the generating regulation shown in FIG. 19, and the generated external document is sent to the input and output control section. In FIG. 20, a numeral is attached to each element of the external document so that each element can be discriminated from elements having the same type of it. In FIG. 20, a mark surrounded by parentheses shows an element of the internal document corresponding to the element.

As described above, in the document database management apparatus of this embodiment, it is possible to take out a stored document as an external document of a document class different from the document class of the original external document.

In the document database management apparatus of this embodiment, in some cases, the original external document is taken out. Therefore, the internal document is stored together with the original external document in the registration of documents, that is, a pair of the external and the internal document are stored. If the documents are not taken out, or alternatively, if the external document is necessarily made from the internal document in the case of taking out the external document, the structure may be composed in such a manner that only the internal document is stored.

In the present invention, the document stored in the database may be expressed by a plurality of different document architectures to define the information structure. Also, the document stored in the database may be expressed by a plurality of different document classes.

As described above, according to the present invention, document data stored in the database and document data generated from the document are managed in conjunction. Therefore, it is possible to solve problems caused by a difference of document data. Specifically, it is possible to prevent the occurrence of an oversight of retrieval, and further it is easy to designate an expression capable of correctly retrieving a target object. Furthermore, it is possible to save time and labor necessary for retrieving documents intended by a user.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document database apparatus comprising:

a database capable of storing a document, the logical structure of which is formed into a first type logical structure;

document input means for inputting a document, the logical structure of which is formed into a second type logical structure;

regulation storage means for storing a regulation to generate a logical structure of a document in the database from a logical structure of a document inputted by said document input means;

document generating means for generating a document in the database, the logical structure of which is formed into the first type logical structure, from a document inputted by said document input means, the logical structure of which is formed into the second type logical structure, according to a regulation stored in said regulation storage means;

document storage means for storing a document generated by said document generating means, the logical structure of which is formed into the first type logical structure, in the database;

retrieval condition input means for inputting a retrieval condition for a document in the database;

document retrieval means for retrieving a document stored in the database according to the retrieval condition inputted by said retrieval condition input means;

second generating regulation storage means for storing a regulation to generate a logical structure of a document using a document class and document schema;

regulation retrieval means for retrieving a regulation stored in said second generating regulation storage means in accordance with the document retrieved by said document retrieval means;

second document generating means for generating a document to be outputted from the document retrieved by said document retrieval means in accordance with the regulation retrieved by said regulation retrieval means, the document class retrieved by document class retrieval means and the document schema retrieved by a document schema retrieval means; and document output means for outputting a document generated by said second document generating means.

2. A document database apparatus comprising:

a database capable of storing a document, the logical structure of which is formed into a first type logical structure;

document input means for inputting a document, the logical structure of which is formed into a second type logical structure;

document schema storage means for storing a document schema defining the first type logical structure of the document in the database;

document class storage means for storing a document class defining the second type logical structure of the document inputted by said document input means;

document class designation means for designating a document class of the document inputted by said document input means;

document schema designation means for designating a document schema in the database of the document inputted by said document input means;

generating regulation storage means for storing a regulation to generate the logical structure of the document in the database using the document class and document schema;

regulation retrieval means for retrieving a regulation stored in said generating regulation storage means in accordance with the document class designated by said document class designation means and the document schema designated by said document schema designation means;

document class retrieval means for retrieving a document class stored in said document class storage means in accordance with the document class designated by said document class designation means;

document schema retrieval means for retrieving a document schema stored in said document schema storage means in accordance with the document schema designated by said document schema designation means;

document generating means for generating a document in the database from the document inputted by said document input means in accordance with the regulation retrieved by said regulation retrieval means, the document class retrieved by said document class retrieval means, and the document schema retrieved by said document schema retrieval means;

document storage means for storing a document generated by said document generating means in the database;

retrieval condition input means for inputting a retrieval condition for a document in the database;

document retrieval means for retrieving a document stored in the database according to the retrieval condition inputted by said retrieval condition input means;

second generating regulation storage means for storing a regulation to generate a logical structure of a document using a document class and document schema;

second regulation retrieval means for retrieving a regulation stored in said second generating regulation storage means in accordance with the document retrieved by said document retrieval means;

second document generating means for generating a document to be outputted from the document retrieved by said document retrieval means in accordance with the regulation retrieved by said second regulation retrieval means, the document class retrieved by said document class retrieval means and the document schema retrieved by said document schema retrieval means; and document output means for outputting a document generated by said second document generating means.

3. A document database storing method applied to a document database apparatus having a database capable of storing a document, the logical structure of which is formed into the first type logical structure, said document database storing method comprising the steps of:

inputting a document, the logical structure of which is formed into the second type logical structure;

previously storing a regulation to generate a logical structure of a document in the database from the logical structure of the inputted document;

generating a document, which is a document in the database, the logical structure of which is formed into the first type logical structure, from a document, which is an inputted document, the logical structure of which is the second type logical structure, in accordance with the stored regulation;

storing a generated document, the logical structure of which is formed into the first type logical structure, in the database;

inputting a retrieval condition for the document in the database;

retrieving a document stored in the database in accordance with the retrieval condition inputted;

previously storing a regulation to generate the logical structure of a document using the document class and document schema;

retrieving the regulation previously stored in accordance with the document retrieved in accordance with the retrieval condition inputted;

generating a document to be outputted from the document retrieved in accordance with the regulation retrieved, the document class retrieved and the document schema retrieved; and outputting the generated document.

4. A document database management method applied to a document database apparatus having a database capable of storing a document, the logical structure of which is formed into the first type logical structure, said document database management method comprising the steps of:

(a) inputting a document, the logical structure of which is formed into the second type logical structure;

(b) previously storing a document schema defining the first type logical structure of the document in the database;

(c) previously storing a document class defining the second type logical structure of the document inputted in step (a);

(d) designating a document class of the document inputted in step (a);

(e) designating a document schema in the database of the document inputted in step (a);

(f) previously storing a regulation to generate a logical structure of the document in the database using the document class and document schema;

(g) retrieving a regulation stored in step (f) in accordance with the document class designated in step (d) and the document schema designated in step (e);

(h) retrieving a document class stored in step (c) in accordance with the document class designated in step (d);

(i) retrieving a document schema stored in step (b) in accordance with the document schema designated in step (e);

(j) generating a document in the database from the document inputted in step (a) in accordance with the regulation retrieved in step (g), the document class retrieved in step (h) and the document schema retrieved in step (i) and storing the document generated in step (j) in the database;

(l) inputting a retrieval condition for the document in the database;

(m) retrieving a document stored in the database in accordance with the retrieval condition inputted in step (l);

(n) previously storing a regulation to generate the logical structure of a document using the document class and document schema;

(o) retrieving a regulation stored in step (n) in accordance with the document retrieved in step (m);

(p) generating a document to be outputted from the document retrieved in step (m) in accordance with the regulation retrieved in step (o), the document class retrieved in step (h) and the document schema retrieved in step (i); and (q) outputting a document generated in step (p).

* * * * *